(12) United States Patent
Miyasaka

(10) Patent No.: US 7,555,959 B2
(45) Date of Patent: Jul. 7, 2009

(54) BOURDON TUBE PRESSURE GAUGE

(75) Inventor: Teruaki Miyasaka, Okaya (JP)

(73) Assignee: Yugenngaisya Fuji Burudon Seisakusho, Okaya-shi (JP)

( * ) Notice: Subject to any disclaimer, the term of this patent is extended or adjusted under 35 U.S.C. 154(b) by 0 days.

(21) Appl. No.: 11/889,641

(22) Filed: Aug. 15, 2007

(65) Prior Publication Data

US 2007/0295097 A1 Dec. 27, 2007

(51) Int. Cl.
*G01L 7/04* (2006.01)
(52) U.S. Cl. .................................... 73/732; 73/741
(58) Field of Classification Search .............. 73/732, 73/741, 742
See application file for complete search history.

(56) References Cited

U.S. PATENT DOCUMENTS

| | | | | |
|---|---|---|---|---|
| 3,327,534 A | * | 6/1967 | Foltz ........................ | 73/741 |
| 3,452,600 A | * | 7/1969 | Gray ........................ | 73/732 |
| 3,908,462 A | * | 9/1975 | Alinari ..................... | 73/741 |
| 4,192,193 A | * | 3/1980 | Schnell .................... | 73/739 |
| 4,542,654 A | * | 9/1985 | Wilson et al. ............. | 73/741 |
| 4,939,338 A | * | 7/1990 | Bregy et al. ........ | 219/137 WM |
| 5,567,883 A | * | 10/1996 | Nara ........................ | 73/741 |
| 5,591,918 A | * | 1/1997 | Ferguson .................. | 73/732 |
| 5,952,579 A | * | 9/1999 | DeFrancesco et al. ... | 73/743 |
| 6,301,764 B1 | * | 10/2001 | Klein et al. ............... | 29/412 |
| 6,651,507 B1 | * | 11/2003 | Hamma et al. ............ | 73/741 |
| 6,684,712 B2 | * | 2/2004 | Klein et al. ............... | 73/732 |
| 7,124,642 B2 | * | 10/2006 | Campbell et al. .......... | 73/732 |
| 7,178,404 B2 | * | 2/2007 | Lee et al. .................. | 73/756 |
| 7,181,976 B2 | * | 2/2007 | Radau ....................... | 73/732 |
| 7,228,743 B2 | * | 6/2007 | Weiss ....................... | 73/732 |
| 2001/0029787 A1 | * | 10/2001 | Klein et al. ............... | 73/732 |

FOREIGN PATENT DOCUMENTS

| | | |
|---|---|---|
| JP | 2002-90242 | 3/2002 |
| JP | 2003-106917 | 4/2003 |
| JP | 2005-134281 | 5/2005 |

* cited by examiner

*Primary Examiner*—Andre J Allen
(74) *Attorney, Agent, or Firm*—Kratz, Quintos & Hanson, LLP

(57) ABSTRACT

Bourdon tube pressure gauge able to make a welding margin of a fastening end of a Bourdon tube and an insertion hole of a tube support broader, and able to ruggedly seal and fix the fastening end, that is, a Bourdon tube pressure gauge having a tube support provided with a fastening insertion hole in which a fastening end of a helical Bourdon tube is inserted, wherein the tube support has a weld metal injection hole reaching the fastening insertion hole in a direction perpendicular to a depth direction of the fastening insertion hole and at a position at the middle of the depth and a weld metal part formed by injecting the weld metal into the weld metal injection hole in a state where the fastening end is inserted in the fastening insertion hole.

4 Claims, 3 Drawing Sheets

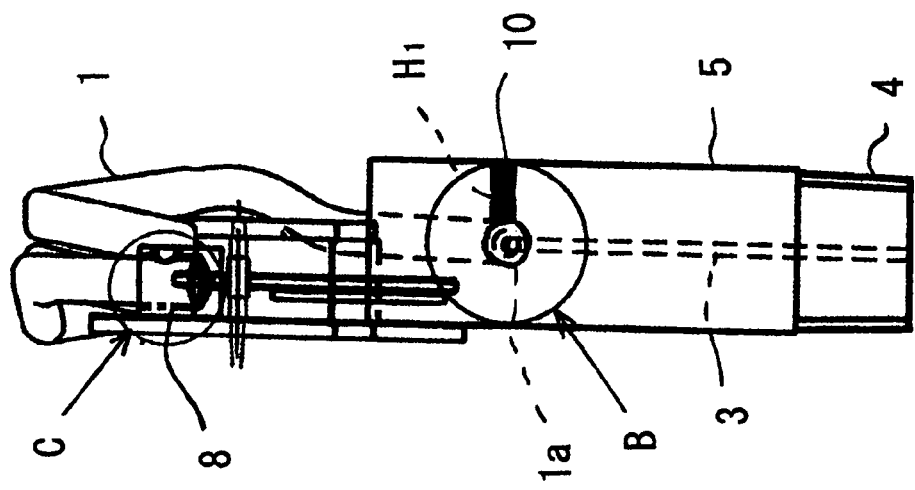
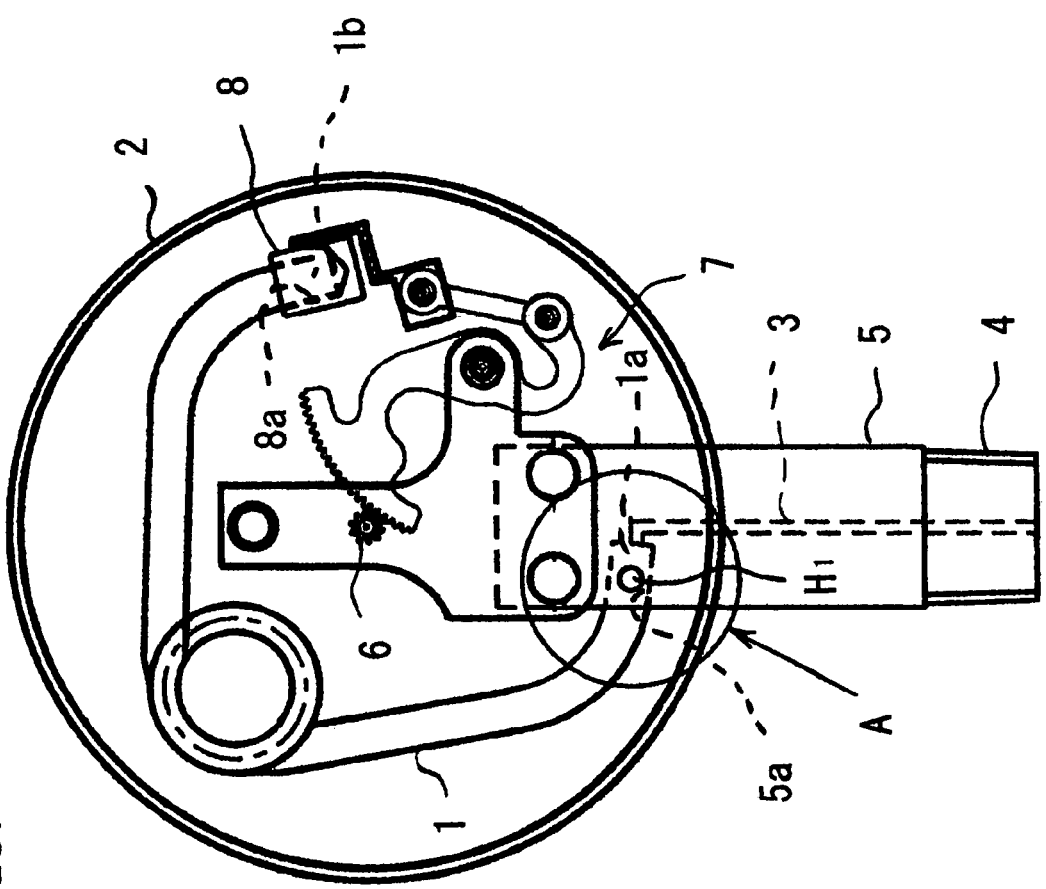
FIG. 1A
FIG. 1B

BOURDON TUBE PRESSURE GAUGE

BACKGROUND OF THE INVENTION

1. Field of the Invention

The present invention relates to a Bourdon tube pressure gauge, more particularly relates to the sealing of a fastening end of the Bourdon tube with a tube support supporting this or the sealing of a free end of the Bourdon tube with a cap closing it.

2. Description of the Related Art

Conventionally, in a Bourdon tube pressure gauge, for example, as a method of sealing and fixing the fastening end of a Bourdon tube to the tube support, generally the fastening end is inserted into an insertion hole of the tube support, then an opening edge of the insertion hole and the circumferential surface of the fastening end are soldered or otherwise welded together. For reference, see Japanese Patent Application No. 2000-280604 (FIG. 3).

However, in the above-described sealing method, the molten solder or other weld metal penetrates into the clearance between the insertion hole and the inserted tube end by capillary action, but the weld metal has a hard time spreading to the clearance space at the deep end where the tube end is inserted and that cannot be judged visually. When the weld margin (fastening margin) remains only at the opening side of the insertion hole in this way, the tube end is liable to detach from the insertion hole at the time vibration or excessive pressure when the Bourdon tube pressure gauge is actually used.

SUMMARY OF THE INVENTION

Therefore, in consideration with the above-described problem, an object of the present invention is to provide a Bourdon tube pressure gauge able to make the welding margin of the tube end of the Bourdon tube and the insertion hole of the tube end mount (tube support or cap) broader and able to ruggedly seal the tube end.

According to the present invention, there is provided a Bourdon tube pressure gauge having a tube end mount comprised of a support or a cap provided with an insertion hole in which a tube end of the Bourdon tube is inserted, wherein the tube end mount has a weld metal injection hole reaching the insertion hole in a direction perpendicular to a depth direction of the insertion hole and at a position at the middle of the depth and a weld metal part formed by injecting the weld metal into the weld metal injection hole in a state where the tube end of the Bourdon tube is inserted in the insertion hole. Here, the tube end mount is a tube support in a case where the tube end is a fastening end, while a cap closing a free end in a case where the tube end is the free end.

In such a constitution, when injecting solder or another weld metal material into the weld metal injection hole in a state where the tube end of the Bourdon tube is inserted in the insertion hole, the weld metal material sneaks around and penetrates the clearance between the insertion hole and the circumferential surface of the tube end inserted in this. The interior of the weld metal injection hole is filled with the weld metal material and forms the weld metal part. The weld metal injection hole intersects the insertion hole at the position at the middle of its depth, therefore the weld metal material penetrates to the opening side and in the depth direction of the insertion hole, so the welding margin becomes wide and strong fastening becomes possible.

If the part of the circumferential surface of the tube end of the Bourdon tube inserted in the insertion hole which faces the weld metal injection hole is indented, the weld metal material is also filled in that indentation, therefore a state where the weld metal part is inserted in the indentation is exhibited. This acts as a locking key. Therefore, the resistance to detachment of the tube end is greatly improved. This indentation can be easily formed by inserting the tube end into the insertion hole, then using the tip of a tool to jab the circumferential surface of the tube end via the weld metal injection hole.

BRIEF DESCRIPTION OF THE DRAWINGS

These and other objects and features of the present invention will become clearer from the following description of the preferred embodiments given with reference to the attached drawings, wherein:

FIG. 1A is a front view showing a Bourdon tube pressure gauge according to an embodiment of the present invention with the indicating needle etc. removed, while FIG. 1B is a right side view showing the Bourdon tube pressure gauge with the gauge case of the same detached;

FIG. 2A is an enlarged view of a part A of FIG. 1A, while FIG. 3A is a front view showing a cap closing a free end of a helical Bourdon tube, while

DESCRIPTION OF THE PREFERRED EMBODIMENTS

Figure 2A:
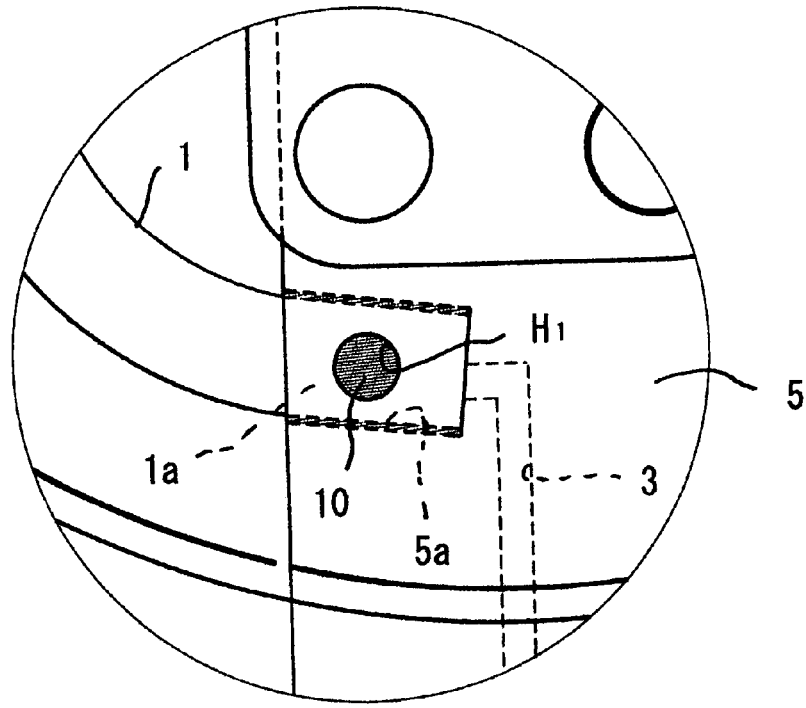

Next, an embodiment of the present invention will be explained based on the attached drawings. FIG. 1A is a front view showing a Bourdon tube pressure gauge according to an embodiment of the present invention with the indicating needle etc. detached, while FIG. 1B is a right side view showing the Bourdon tube pressure gauge with the gauge case detached.

The Bourdon tube pressure gauge of the present example has a flat columnar gauge case 2 accommodating a helical Bourdon tube 1 and a tube support 5 provided with a pressure introduction passage 3 communicated with the helical Bourdon tube 1 and having a male thread 4 screwing together with a threaded hole at the pressure source side at its lower part. A part of the helical Bourdon tube 1 from a free end 1*b* to a pinion 6 fixed to an indicating needle shaft (not shown) becomes a displacement magnification mechanism 7.

The fastening end 1*a* of the helical Bourdon tube 1 is inserted in a fastening end insertion hole 5*a* formed in the tube support 5 and communicated with the pressure introduction passage 3. On the other hand, the free end 1*b* of the helical Bourdon tube 1 is inserted in a free end insertion hole 8*a* formed in a cap 8 closing this.

Figure 2B:
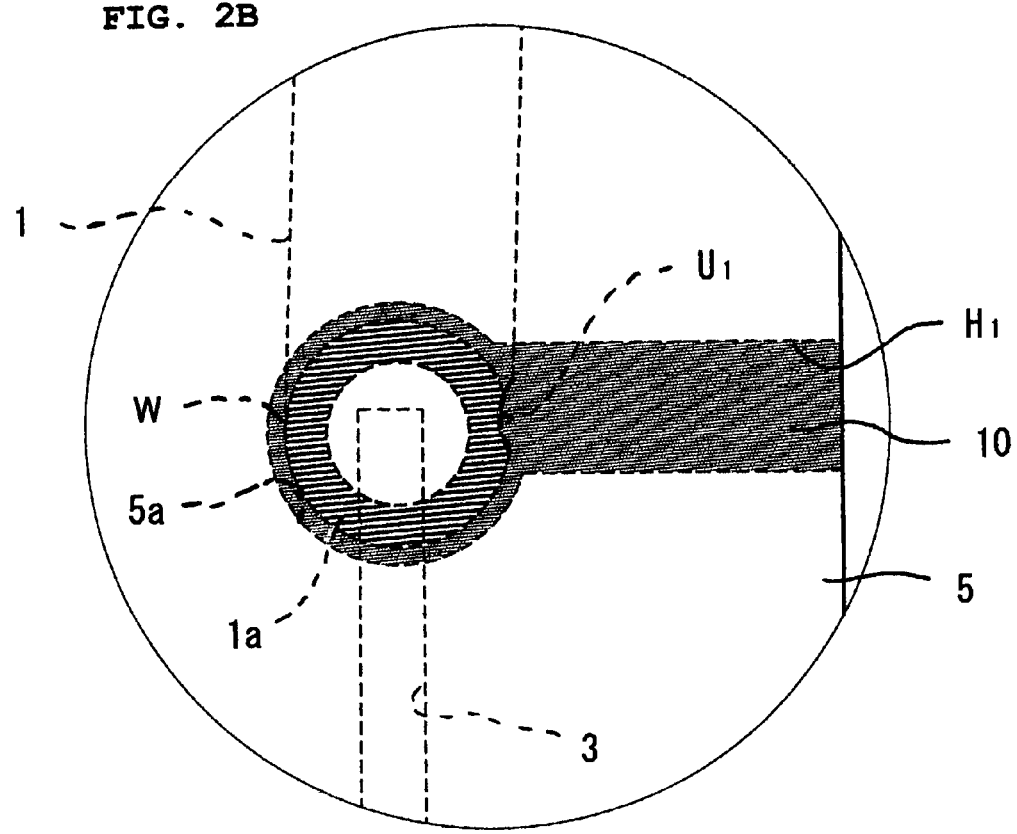
FIG. 2B is an enlarged view of a part B of FIG. 1B.

FIG. 2A is an enlarged view of a part A of FIG. 1A, and FIG. 2B is an enlarged view of a part B of FIG. 1B. The tube support 5 has a weld metal injection hole $H_1$ reaching the fastening end insertion hole 5*a* in a direction perpendicular to the depth direction of the fastening end insertion hole 5*a* and at the position at the middle of the depth. As shown in FIG. 2B, a part of the circumferential surface of the fastening end 1*a* inserted in this fastening end insertion hole 5*a* which faces the weld metal injection hole $H_1$ becomes a recessed curved indentation $U_1$. Then, solder or another weld metal material W is injected into the weld metal injection hole $H_1$ to bury the weld metal part 10 in a state where the fastening end 1*a* is inserted in the fastening end insertion hole 5*a*.

Figure 3A:
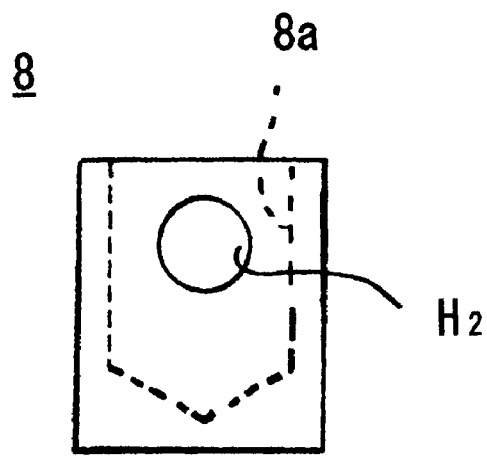
Figure 3B:
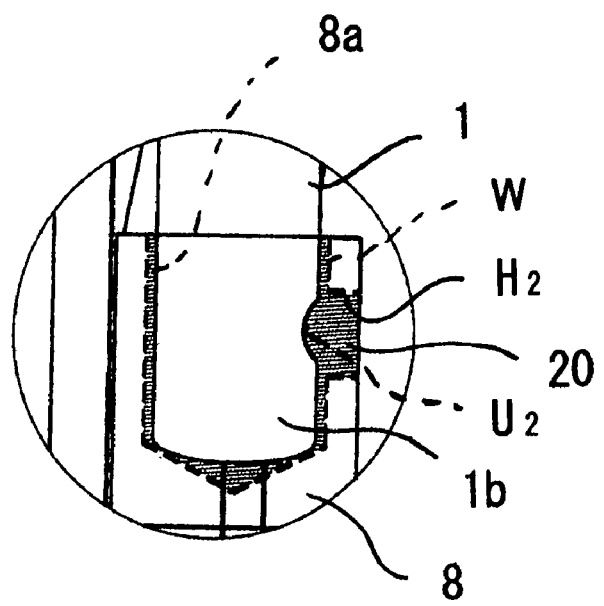
FIG. 3B is an enlarged view of a part C of FIG. 1B.

FIG. 3A is a front view showing a cap closing the free end of a circular helical Bourdon tube, and FIG. 3B is an enlarged view of a part C of FIG. 1B. The cap 8 has a round weld metal injection hole $H_2$ reaching the free end insertion hole 8a in the direction perpendicular to the depth direction of the free end insertion hole 8a and at a position at the middle of the depth. As shown in FIG. 3B, a part of the circumferential surface of the free end 1a inserted in this free end insertion hole 8a which faces the weld metal injection hole $H_2$ becomes a recessed curved indentation $U_2$. Then, solder or another weld metal material W is injected into the weld metal injection hole $H_2$ to bury the weld metal part 20 in a state where the free end 1b is inserted in the free end insertion hole 8a.

In the production of the Bourdon tube pressure gauge, when solder or another weld metal material W is injected into the weld metal injection hole $H_1$ in the state where the fastening end 1a of the helical Bourdon tube 1 is inserted in the fastening end insertion hole 5a, the weld metal material W sneaks around and penetrates the clearance between the fastening end insertion hole 5a and the circumferential surface of the fastening end 1a inserted in this. The interior of the weld metal injection hole is filled with the weld metal material W and forms the weld metal part 10. The weld metal injection hole $H_1$ intersects the fastening end insertion hole 5a at the position at the middle of its depth, therefore the weld metal material W penetrates to the opening side and in the depth direction of the fastening end insertion hole 5a, so the welding margin becomes wide and strong fastening becomes possible. For this reason, soldering alone is possible without having to use high strength silver brazing filler metal and the heat effect on the Bourdon tube 1 can be reduced.

Since at least the part of the circumferential surface of the fastening end 1a facing the weld metal injection hole $H_1$ becomes the indentation $U_1$, the indentation $U_1$ is also filled with the weld metal material W. For this reason, a state where the weld metal part 10 is fit in the indentation $U_1$ is exhibited. This acts as a locking key. Therefore, the resistance to detachment of the fastening end 1a is greatly improved. This indentation $U_1$ can be easily formed by inserting the fastening end 1a into the fastening end insertion hole 5a, then using the tip of a tool to jab the circumferential surface of the fastening end via the weld metal injection hole $H_1$.

On the other hand, if injecting solder or another weld metal material W into the weld metal injection hole $H_2$ in the state where the free end 1b of the helical Bourdon tube 1 is inserted in the free end insertion hole 8a of the cap 8, the weld metal material W sneaks around and penetrates the clearance between the free end insertion hole 8a and the circumferential surface of the free end 1b inserted in this. The interior of the weld metal injection hole $H_2$ is filled with the weld metal material W to form the weld metal part 20. The weld metal injection hole $H_2$ intersects the free end insertion hole 8a at the position of the middle of the depth. Therefore, the weld metal material W penetrates to the opening side and depth direction of the free end insertion hole 8a, so the welding margin becomes wide and strong fastening of the free end 1b becomes possible. For this reason, soldering alone is possible without having to use high strength silver brazing filler metal and the heat effect on the Bourdon tube 1 can be reduced.

At least the part of the circumferential surface of the free end 1b facing the weld metal injection hole $H_2$ becomes the indentation $U_2$, therefore the indentation $U_2$ is also filled with the weld metal material W. For this reason, a state where the weld metal part 20 is fit in the indentation $U_2$ is exhibited. This acts as a locking key. Therefore, the resistance to detachment of the free end 1b is greatly improved. This indentation $U_2$ can be easily formed by inserting the free end 1b into the free end insertion hole 8a, then using the tip of a tool to jab the circumferential surface of the free end via the weld metal injection hole $H_2$.

While the invention has been described with reference to specific embodiments chosen for purpose of illustration, it should be apparent that numerous modifications could be made thereto by those skilled in the art without departing from the basic concept and scope of the invention.

The invention claimed is:

1. A Bourdon tube pressure gauge having a tube end mount comprised of a support or a cap provided with an insertion hole in which a tube end of the Bourdon tube is inserted, wherein the tube end mount comprises:
    a weld metal injection hole reaching the insertion hole in a direction perpendicular to a depth direction of the insertion hole and at a position at the middle of the depth; and
    a weld metal part formed by injecting the weld metal into the weld metal injection hole in a state where the tube end of the Bourdon tube is inserted in the insertion hole.

2. A Bourdon tube pressure gauge as set forth in claim 1, wherein at least a part of a circumferential surface of the tube end of the Bourdon tube inserted in said insertion hole which faces said weld metal injection hole is indented.

3. A Bourdon tube pressure gauge as set forth in claim 1, wherein said tube end is a fastening end, and said tube end mount is a tube support.

4. A Bourdon tube pressure gauge as set forth in claim 1, wherein said tube end is a free end, and said tube end mount is a cap closing said free end.

* * * * *